United States Patent [19]

Wu

[11] 3,969,489

[45] July 13, 1976

[54] PROCESS FOR RECOVERING SYNTHETIC DIAMONDS FROM PRESSED RUNS

[75] Inventor: Mu-Sheng Wu, Worthington, Ohio

[73] Assignee: General Electric Company, Columbus, Ohio

[22] Filed: Sept. 24, 1975

[21] Appl. No.: 616,299

[52] U.S. Cl. .............................. 423/446; 423/461
[51] Int. Cl.$^2$ ................................ C01B 31/06
[58] Field of Search ............... 423/446, 460, 461

[56] References Cited

UNITED STATES PATENTS

| | | | |
|---|---|---|---|
| 3,348,918 | 10/1967 | Kruse | 423/446 |
| 3,630,677 | 12/1971 | Angus | 423/446 |
| 3,644,094 | 2/1972 | Stevens | 423/446 |
| 3,851,027 | 11/1974 | Balchan et al. | 423/446 X |

FOREIGN PATENTS OR APPLICATIONS

| 47-44159 | 5/1969 | Japan | 423/446 |
|---|---|---|---|

OTHER PUBLICATIONS

Young, "Chemical Abstracts," vol. 45, 1951, 8221(g).
Pokorny, "Chemical Abstracts," vol. 56, 1962 11,207(a).

Primary Examiner—Edward J. Meros
Attorney, Agent, or Firm—Dennis A. Dearing; Donald J. Voss; Frank H. Neuhauser

[57] ABSTRACT

A diamond synthesis run containing synthetic diamonds, graphite and catalyst from a high pressure temperature diamond process is treated with bromine to remove substantially all of the graphite. After bromination, the run is subjected to electrolysis to remove the catalyst metals leaving the diamond product for recovery. Some of the diamonds may have a layer of graphite which is exfoliated by further treatment with liquid bromine.

16 Claims, No Drawings

PROCESS FOR RECOVERING SYNTHETIC DIAMONDS FROM PRESSED RUNS

BACKGROUND OF THE INVENTION

The synthesis of diamond crystals by high temperature, high pressure processes are well known. Preferred methods for making diamonds are disclosed in Hall et al., U.S. Pat. No. 2,947,610, Strong, U.S. Pat. No. 2,947,609. Apparatus for carrying out such processes is described in Hall, U.S. Pat. No. 2,941,248.

Briefly, diamond growth in the aforementioned processes occurs by the diffusion of carbon through a thin metallic film of any of a series of specific catalyst, preferably an alloy of at least two metals with one of the metals selected from the class consisting of group VIII metals of the periodic table, chromium, tantalum and manganese. The reaction results in a composition, referred to as a "run," which contains a mixture of diamond; graphite (from the carbon source); and the catalyst.

The recovery of the diamond from the run has presented certain problems relating to cost and undesirable by-products. The recovery of diamonds from the runs has generally been accomplished by the treatment of the runs with acids. However, in these acid recovery processes, treatment of ventilation air and waste acids is necessary prior to discharge from the recovery facility into waste disposal facilities.

Therefore, the acid recovery process requires substantial capital expenditures to limit pollution discharge, and results in wasted material.

Additionally, drawbacks have been observed in all of these processes. A complete removal of graphite often requires repeating the process several times in the acid methods, thereby resulting in time consumption and material loss in addition to the pollution problems mentioned above.

Finally, complete removal of the graphite or nondiamond carbonaceous material is difficult when small amounts of graphite are left after removal of substantially all the other synthesis material from the diamond crystals. The final removal of graphite oxidation of the graphite, utilizing alkali earth metal carbonates has been suggested, see Showa Denko KK, Japanese Pat. No. SHO 47-44159, issued Nov. 8, 1972. However, some diamond loss due to oxidation is inevitable.

The synthesis of diamond crystals may also be achieved by a dynamic process as opposed to the so-called static processes just described. An example of such a dynamic process is described in Balchan, U.S. Pat. No. 3,608,014 wherein an explosive charge is utilized to create the pressure and temperature necessary for the conversion of graphite into diamond.

The recovery of the diamond crystals from a dynamic process presents similar problems to those encountered with static processes and as described in Example I of the Balcan patent an oxidation process is used to separate the graphite and diamonds which leads to undesirable polution problems.

SUMMARY OF THE INVENTION

The present invention overcomes the problems associated with the acid recovery processes by first treating the run with liquid bromine to remove substantially all of the non-diamond carbonaceous material. The bromine and non-diamond carbon are drawn off and the remaining product is subjected to electrolysis to plate out the catalyst metal thereby leaving the diamond crystals substantially free of all of the graphite and catalyst. After electrolysis some of the diamond crystals may be coated with a layer of graphite, which is removed by a final treatment with bromine to exfoliate the layer leaving the diamonds free of synthesis material.

The bromine and non-diamond carbon mixtures are distilled and the bromine recycled for repeated use. Also the electrolyte may be used repeatedly and the catalyst metal which is plated out may be sold for recovery purposes. Thus, the process permits economical recovery of diamonds from the diamond synthesis materials without unwanted vapors or expensive pollution control equipment and provides a method approaching near zero pollution and near zero material loss.

Graphite-halogen lamellar compounds have been the subject of investigation for many years. However, bromine as a medium for separating and recovering diamond crystals from synthesis compositions has not been suggested prior to the present invention. The ability to recycle or recapture major components of the recovery and synthesis materials provides a desirable process both from an economic and an environmental standpoint.

Graphite-halogen lamellar compounds are described in the literature but not for the use of the present invention. Ubbelohde et al., *Graphite and Its Crystal Compounds*, § § 5.3, 5.4, 5.6.1; 6.3.2. Oxford (1960) describes a variety of observations of graphite halogen compounds including bromine. Sanders G. A. et al. have also reported on experimental observations of bromine graphite reactions in *The Formation of Graphite/Bromine, I. Hysteresis of Bromine Insertion Between The Carbon Hexagon Layers* and *II. The Influence of External Pressure On Bromine Uptake*, Proc. Roy. Soc. A271 499–511; 512-519 (1963). The investigations of several researchers are summarized in Reynolds, W. N., *Physical Properties of Graphite*, 126–128, Elsevier, N.Y. (1968). And the penetration of bromine in pyrocarbon is reported in Marchand, A. et al., *Direct Observation of Bromine Penetration Into a Pryocarbon Sample*, Carbon 11, 666–668 (1973).

Bromine and other halogens have been used with graphite for purification, Woodruff et al., U.S. Pat. No. 1,380,458, Brooks, U.S. Pat. Nos. 2,734,799 and 2,734,900 and to produce hyperconductive graphite structures, Olstowshi, U.S. Pat. No. 3,409,563, and lubricants Knappworst, U.S. Pat. No. 3,377,280.

DETAILED DESCRIPTION OF A PREFERRED EMBODIMENT

While this invention is susceptible of embodiment in many different forms, there is contemplated and will hereinafter be described in detail a preferred embodiment of the invention with the understanding that the present disclosure is to be considered as an exemplification of the principles of the invention and is not intended to limit the invention to the embodiment illustrated.

The production of synthetic diamonds is now commercially feasible when a source of carbon, i.e., graphite, is subjected to pressure and temperature in the diamond stable region of the carbon phase diagram provided that a metallic catalyst is present. As discussed in the above-identified Strong patent, incorporated herein by reference, the catalyst may consist of a metal selected from the class consisting of group VIII metals of the periodic table, chromium, tantalum and manganese. Preferably, however, the catalyst includes an alloy of two metals one of which is selected from the above class. The other elements of the alloy may be catalyst or non-catalyst metals.

After the diamond synthesis material has been treated by the high pressure, high temperature process, a portion of the carbon is converted into diamond crystals. These crystals are interspersed in the synthesis material and must be separated therefrom. This material referred to as a pressed run is generally a cylindrical shaped mass from which the diamonds must be recovered. Generally, the diamonds are located at the interface between the alloy catalyst and the carbonaceous material.

Recovery of the diamonds from the pressed run in accordance with the present invention involves a combination of steps to provide cleansed crystals. The run is first immersed in a bath of liquid bromine to dissolve the graphite. Graphite has a layer structure and consists of hexagonal networks in the layers. The distance between two adjacent atoms is 1.415 A. The separation of the layers is 3.35 A. This great distance between the layers suggests that the forces acting between the layers, Van der Waals bonds, are weak. This property makes it possible for many molecules and ions to penetrate between the layers forming intercalated, interstitial, or lamellar compounds. When bromine is introduced to graphite, a bromine lamellar compound $C_8Br$ is formed. Graphite can absorb up to 83% by weight of bromine. Measurements of the macroscopic volume expansion and the changes in X-ray diffraction indicate that bromine occupies only alternate layers, expanding the separation between them from 3.35 A to 7.05 A. This corresponds to a macroscopic increase in thickness of the graphite crystallites of 55% in the direction of the C-axis. When the brominated graphite is subjected to a further attack of bromine, the exfoliated graphite is broken into small pieces.

After the graphite has been dissolved, the bromine-graphite mixture is separated from the run material, and the remaining metal can be removed by dissolving in mineral acid or by electroplating leaving the diamond crystals.

Thus, the use of liquid bromine provides a convenient method of reducing the mass of the run for subsequent metal removal. Moreover, the mixture of bromine and $C_8Br$ (exfoliated graphite) may be distilled and the condensed bromine recycled for subsequent treatment of runs. Preliminary recovery tests indicate that about 98% of the liquid bromine may be recycled.

The electrolysis of the catalyst may be achieved by the use of a proper electrolyte depending on the type of catalyst metals, discussed above. Examples of the process are given as follows:

EXAMPLE I

A batch of pressed runs weighing 298 grams containing diamond crystals, graphite and NiFe catalyst were pretreated with 474 grams of liquid bromine at room temperature, initially. The pretreatment was carried out adiabatically for one hour. The pretreated batch was heated gently to expel the bromine. Subsequently, the remaining batch of materials (diamond crystal and catalyst) were subjected to electrolysis at a voltage of about 7 volts D.C., a current of about 15 amperes, and a temperature of about 77°C (170°F). The electrolysis was completed in 20 hours. The electrolyte had the following constituents:

| | |
|---|---|
| $NiCl_2$ $6H_2O$ | 900 gr./3000 c.c. of solution |
| HCl (36%) | 20 gr./3000 c.c. of solution |
| $NH_4Cl$ | 40 gr./3000 c.c. of solution |

EXAMPLE II

This procedure was run in a full scale prototype recovery process in which a batch of 240 runs was pretreated with 20 gallons of liquid bromine for two hours. The liquid was then drawn off and distilled and condensed to recover the liquid bromine. About 15 pounds, approximately ½ gallon of bromine was not recovered. After bromination, 80 runs of the original 240 runs were placed on a horizontal circular graphite plate which was immersed in an electrolysis tank containing 55 gallons of the nickel chloride electrolyte as follows. The remainder of the electrolyte solution is water.

| | |
|---|---|
| $NiCl_2 6H_2O$ | 300 g/l. of water |
| HCl (100%) | 3 g/l. of water |
| $NH_4Cl$ | 15 g/l. of water |
| $H_3BO_3$ | 15 g/l. of water |

A mild steel plate 1/16 inch thick was used for the cathode and positioned about 5 inches above the anode (graphite plate). A potential of 6–8 volts, D.C. and 200 amperes was applied to produce electrolysis of the iron and nickel to the steel plate. The process was maintained at 125°F, and the process was completed in 60–80 hours.

Some of the synthetic diamonds are still covered with graphite from the synthesis process and must be removed. This is accomplished by bathing the crystal in liquid bromine. The bromine due to its specific gravity of 2.928 causes the exfoliated carbon, specific gravity 2.23 or less, to float on the bromine. Most importantly, however, the bromine has an exfoliating property. As discussed above, this is achieved by the absorption of bromine by the graphite to form $C_8Br$ and further attack of the $C_8Br$ to release the carbon. This also results in the delamination of the carbon layer structure. Therefore, this final immersion of the crystals in bromine results in complete removal of the diamond synthesis materials.

The exfoliated carbon and bromine may then be decanted from the bath and the decant is evaporated and condensed to recover the bromine for repeated use with minimal loss of material and solution.

The graphite exfoliated diamond is then treated with NaOH to neutralize any trace of bromine on the crystals.

EXAMPLE III

Fifty grams of graphite containing synthetic diamonds were placed in a 100 m.l. beaker. Bromine at room temperature was added to the beaker and allowed to stand for 1 hour. Subsequently, more bromine was added to float out the non-diamond carbon. The beaker was then emptied of bromine and treated with 10% NaOH solution to neutralize trace bromine on the crystals.

Although the process has been described with reference to bi-metallic catalyst pressed runs, it will be appreciated that the process is also effective for single metal catalyst pressed runs and dynamic synthesis runs, which may not include a catalyst.

What is claimed is:

1. A process for the recovery of synthetic diamond from a diamond synthesis run containing diamond crystals, a non-diamond carbonaceous material and a metallic catalyst which comprises: pretreating the run with liquid bromine to dissolve the non-diamond carbonaceous material; separating the bromine-carbon mixture from the remaining run material; chemically treating the remaining run material to remove the catalyst; and recovering the remaining diamond crystals.

2. The process of claim 1, including the steps of distilling the bromine-carbon mixture to condense liquid bromine, and recycling the condensed bromine for subsequent use.

3. The process of claim 1, wherein said catalyst is an alloy of at least two metals, one of the metals being selected from the class consisting of group VIII metals of the periodic table, chromium, tantalum and manganese.

4. The process of claim 3, wherein said catalyst is an alloy of nickel and iron.

5. The process of claim 1, wherein said chemical treating step is electrolysis to plate out the catalyst.

6. The process of claim 1, wherein said catalyst is a metal selected from the class consisting of group VIII metals of the periodic table, chromium, tantalum and manganese.

7. The process of claim 6, wherein said catalyst is nickel.

8. The process of claim 1, including the steps of immersing said recovered diamond crystals in liquid bromine to exfoliate remaining graphite adhering to said crystals; decanting the exfoliated carbon and bromine; neutralizing the trace bromine on the crystals; and removing the crystals.

9. The process of claim 8, wherein said neutralizing step is performed by treating said crystal with a solution of NaOH.

10. A process for the recovery of synthetic diamonds from a press, diamond synthesis run containing diamond crystals, graphite aand a metallic catalyst which comprises: pretreating the run with liquid bromine to dissolve the non-diamond carbonaceous material; drawing off the bromine-carbon mixture from the remaining run material; placing the remaining run material on an anode plate in a nickel-chloride electrolyte bath; electrolyzing the remaining run material to plate out the metallic catalyst and recovering the remaining diamond.

11. The process of claim 10, including the steps of distilling the bromine-graphite solution to condense liquid bromine, and recycling the condensed bromine for subsequent use.

12. The process of claim 10, including the steps of immersing said recovered diamond crystals in liquid bromine to exfoliate remaining graphite adhering to said crystals; decanting the exfoliated carbon and bromine; neutralizing the trace bromine on the crystals and removing the crystals.

13. A process for the removal of graphite from synthetic diamond crystals having a layer of graphite thereon comprising the steps of: immersing said crystal in a bath of liquid bromine; maintaining said crystals in said bath until said bromine exfoliates the non-diamond carbon from said crystals; decanting the exfoliated carbon and bromine, and removing the graphite exfoliated crystals.

14. The process of claim 13, further including treating the removed crystals with a solution of NaOH to neutralize trace bromine thereon.

15. The process of claim 13, further including evaporating the decanted graphite and bromine; condensing the bromine vapors and recycling the condensed bromine for further use.

16. A process for the removal of graphite from a composition comprising synthetic diamonds and graphite material, which comprises immersing said composition in a bath of liquid bromine, maintaining the composition in said bath until said bromine penetrates the graphite and exfoliates the non-diamond carbon.

* * * * *